(12) United States Patent
Merry et al.

(10) Patent No.: US 7,874,163 B2
(45) Date of Patent: Jan. 25, 2011

(54) STARTER GENERATOR SYSTEM FOR A TIP TURBINE ENGINE

(75) Inventors: Brian Merry, Andover, CT (US); Scot Adams Webb, Gales Ferry, CT (US); Michael McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 878 days.

(21) Appl. No.: 11/718,416

(22) PCT Filed: Dec. 1, 2004

(86) PCT No.: PCT/US2004/040216

§ 371 (c)(1),
(2), (4) Date: May 2, 2007

(87) PCT Pub. No.: WO2006/060014

PCT Pub. Date: Jun. 8, 2006

(65) Prior Publication Data

US 2009/0120100 A1   May 14, 2009

(51) Int. Cl.
*F02C 7/275* (2006.01)
(52) U.S. Cl. .......................... 60/788; 60/786
(58) Field of Classification Search .............. 60/786, 60/788, 802, 226.1
See application file for complete search history.

(56) References Cited

U.S. PATENT DOCUMENTS

| | | | |
|---|---|---|---|
| 1,544,318 A | 6/1925 | Hodgkinson | |
| 2,221,685 A | 11/1940 | Smith | |
| 2,414,410 A | 1/1947 | Griffith | |
| 2,499,831 A | 3/1950 | Palmatier | |
| 2,548,975 A | 4/1951 | Hawthorne | |
| 2,611,241 A | 9/1952 | Schulz | |
| 2,620,554 A | 12/1952 | Mochel et al. | |
| 2,698,711 A | 1/1955 | Newcomb | |
| 2,801,789 A | 8/1957 | Moss | |
| 2,830,754 A | 4/1958 | Stalker | |
| 2,874,926 A | 2/1959 | Gaubatz | |
| 2,989,848 A | 6/1961 | Paiement | |
| 3,009,630 A | 11/1961 | Busquet | |
| 3,037,742 A | 6/1962 | Dent et al. | |
| 3,042,349 A | 7/1962 | Pirtle et al. | |
| 3,081,597 A | 3/1963 | Kosin et al. | |
| 3,132,842 A | 5/1964 | Tharp | |
| 3,204,401 A | 9/1965 | Serriades | |
| 3,216,455 A | 11/1965 | Cornell et al. | |
| 3,264,482 A * | 8/1966 | Clark et al. ............... | 290/38 A |
| 3,267,667 A | 8/1966 | Erwin | |

(Continued)

FOREIGN PATENT DOCUMENTS

DE    1173292    7/1964

(Continued)

*Primary Examiner*—Michael Cuff
*Assistant Examiner*—Phutthiwat Wongwian
(74) *Attorney, Agent, or Firm*—Carlson, Gaskey & Olds, PC

(57) ABSTRACT

A starter-generator system for a tip turbine engine includes a starter motor with a fixed starter generator stator and a starter generator rotor. The fixed starter generator stator is mounted to a static inner support housing. The starter generator rotor surrounds the fixed starter generator stator and is engagement with the axial compressor rotor.

5 Claims, 3 Drawing Sheets

U.S. PATENT DOCUMENTS

| | | | |
|---|---|---|---|
| 3,269,120 A | 8/1966 | Sabatiuk | |
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Flatt | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A | 6/1974 | Rylewski | |
| 3,836,279 A | 9/1974 | Lee | |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,130,379 A | 12/1978 | Partington | |
| 4,147,035 A | 4/1979 | Moore et al. | |
| 4,251,185 A | 2/1981 | Karstensen | |
| 4,251,987 A | 2/1981 | Adamson | |
| 4,265,646 A | 5/1981 | Weinstein et al. | |
| 4,271,674 A | 6/1981 | Marshall et al. | |
| 4,298,090 A | 11/1981 | Chapman | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A | 6/1988 | Perry | |
| 4,785,625 A | 11/1988 | Stryker et al. | |
| 4,799,354 A * | 1/1989 | Midgley | 60/788 |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,999,994 A | 3/1991 | Rud et al. | |
| 5,010,729 A | 4/1991 | Adamson et al. | |
| 5,012,640 A | 5/1991 | Mirville | |
| 5,014,508 A | 5/1991 | Lifka | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,237,817 A * | 8/1993 | Bornemisza et al. | 60/226.1 |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,443,590 A | 8/1995 | Ciokajlo et al. | |
| 5,466,198 A | 11/1995 | McKibbin et al. | |
| 5,497,961 A | 3/1996 | Newton | |
| 5,501,575 A | 3/1996 | Eldredge et al. | |
| 5,537,814 A * | 7/1996 | Nastuk et al. | 60/796 |
| 5,584,660 A | 12/1996 | Carter et al. | |
| 5,628,621 A | 5/1997 | Toborg | |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,158,207 A | 12/2000 | Polenick et al. | |
| 6,223,616 B1 | 5/2001 | Sheridan | |
| 6,244,539 B1 | 6/2001 | Lifson et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,430,917 B1 | 8/2002 | Platts | |
| 6,454,535 B1 | 9/2002 | Goshorn et al. | |
| 6,471,474 B1 | 10/2002 | Mielke et al. | |
| RE37,900 E | 11/2002 | Partington | |
| 6,513,334 B2 | 2/2003 | Varney | |
| 6,619,030 B1 | 9/2003 | Seda et al. | |
| 6,851,264 B2 | 2/2005 | Kirtley et al. | |
| 6,883,303 B1 | 4/2005 | Seda | |
| 6,910,854 B2 | 6/2005 | Joslin | |
| 7,021,042 B2 | 4/2006 | Law | |
| 7,214,157 B2 | 5/2007 | Flamang et al. | |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0192304 A1 | 10/2003 | Paul | |
| 2004/0025490 A1 | 2/2004 | Paul | |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2004/0255590 A1* | 12/2004 | Rago et al. | 60/772 |
| 2005/0008476 A1 | 1/2005 | Eleftheriou | |
| 2005/0127905 A1 | 6/2005 | Proctor et al. | |
| 2005/0199766 A1* | 9/2005 | Knott et al. | 244/55 |
| 2005/0284150 A1* | 12/2005 | Dittmar et al. | 60/788 |

FOREIGN PATENT DOCUMENTS

| | | |
|---|---|---|
| DE | 19519322 | 11/1996 |
| FR | 1367893 | 7/1964 |
| GB | 905136 | 9/1962 |
| GB | 1026102 | 4/1966 |
| GB | 1287223 | 8/1972 |
| GB | 1338499 | 11/1973 |
| GB | 2026102 | 1/1980 |
| JP | 10184305 | 7/1998 |
| WO | 9902864 | 1/1999 |
| WO | 02081883 | 10/2002 |
| WO | 2004022948 | 3/2004 |
| WO | 2004092567 | 10/2004 |
| WO | 2006059973 | 6/2006 |
| WO | 2006059974 | 6/2006 |
| WO | 2006059981 | 6/2006 |
| WO | 2006059994 | 6/2006 |
| WO | 2006059995 | 6/2006 |
| WO | 2006060011 | 6/2006 |
| WO | 2006060013 | 6/2006 |
| WO | 2006060014 | 6/2006 |

* cited by examiner

STARTER GENERATOR SYSTEM FOR A TIP TURBINE ENGINE

This invention was made with government support under Contract No.: F33657-03-C-2044. The government therefore has certain rights in this invention.

BACKGROUND OF THE INVENTION

The present invention relates to a tip turbine engine, and more particularly to a starter-generator system.

An aircraft gas turbine engine of the conventional turbofan type generally includes a forward fan, a low pressure compressor, a middle core engine, and an aft low pressure turbine all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor and ignited to form a high energy gas stream. The gas stream flows axially aft to rotatably drive the high pressure turbine which rotatably drives the high pressure compressor through the high spool shaft. The gas stream leaving the high pressure turbine is expanded through the low pressure turbine which rotatably drives the fan and low pressure compressor through a low pressure shaft.

Although highly efficient, conventional turbofan engines operate in an axial flow relationship. The axial flow relationship results in an elongated engine structure of considerable longitudinal length relative to the engine diameter. This elongated shape may complicate or prevent packaging of the engine into particular applications.

A recent development in gas turbine engines is the tip turbine engine. Tip turbine engines locate an axial compressor forward of a fan which includes hollow fan blades that receive airflow from the axial compressor therethrough such that the hollow fan blades operate as a centrifugal compressor. Compressed core airflow from the hollow fan blades is mixed with fuel in an annular combustor and ignited to form a high energy gas stream which drives the turbine integrated onto the tips of the hollow fan blades for rotation therewith as generally disclosed in U.S. patent Application Publication Nos.: 20030192303; 20030192304; and 20040025490.

The tip turbine engine provides a thrust to weight ratio equivalent to conventional turbofan engines of the same class within a package of significantly shorter length.

Conventionally, a dedicated starter and a dedicated generator with both machines mounted onto a gearbox that is coupled to the high spool shaft via a gear driven towershaft. As the starter accelerates the engine, a fuel delivery pump driven by a gearbox attached to a rotor of the gas turbine engine provides fuel flow thereto. Igniters are then actuated to effect ignition in a combustor of the engine. Upon successful ignition, and once the engine has reached a self-sustaining speed, the starter is disengaged and the generator is engaged.

Accordingly, it is desirable to provide a lightweight starter-generator for a tip turbine engine which avoids an accessory gearbox and operation in an oil environment.

SUMMARY OF THE INVENTION

A starter-generator system for a tip turbine engine according to the present invention includes a starter motor with a fixed starter generator stator mounted to a static inner support housing. A starter generator rotor surrounds the fixed starter generator stator and is engaged with the axial compressor rotor.

The present invention therefore provides a lightweight starter-generator for a tip turbine engine which avoids an accessory gearbox and operation in an oil environment.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
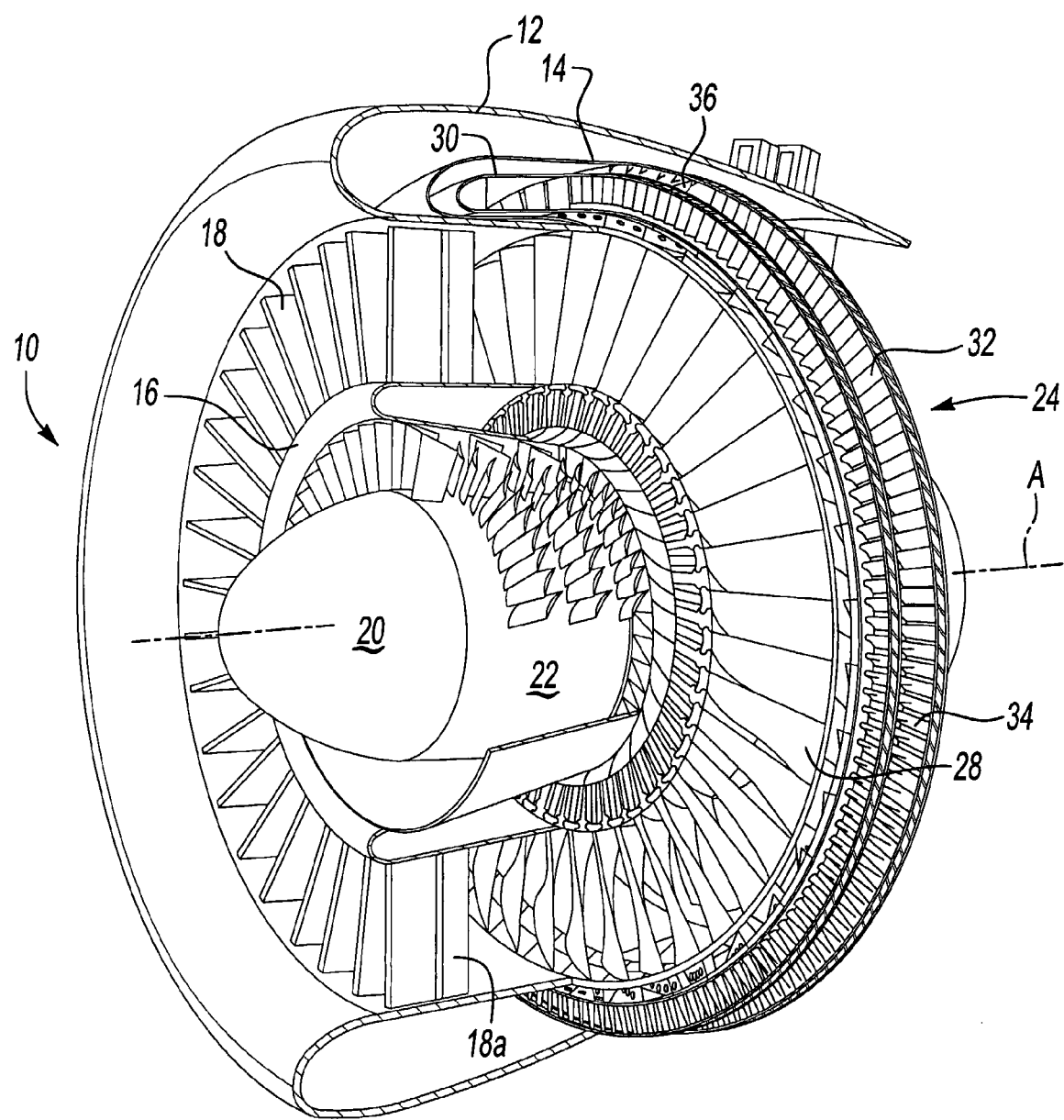
FIG. 1 is a partial sectional perspective view of a tip turbine engine.

FIG. 1 illustrates a general perspective partial sectional view of a tip turbine engine type gas turbine engine 10. The engine 10 includes an outer nacelle 12, a rotationally fixed static outer support structure 14 and a rotationally fixed static inner support structure 16. A multitude of fan inlet guide vanes 18 are mounted between the static outer support structure 14 and the static inner support structure 16. Each inlet guide vane 18 preferably includes a movable trailing edge portion 18A which may be articulated relative to the fixed inlet guide vane 18.

A nose cone 20 is preferably located along the engine centerline A to smoothly direct airflow into an axial compressor 22. The axial compressor 22 is mounted about the engine centerline A behind the nose cone 20.

A fan-turbine rotor assembly 24 is mounted for rotation about the engine centerline A aft of the axial compressor 22. The fan-turbine rotor assembly 24 includes a multitude of hollow fan blades 28 to provide internal, centrifugal compression of the compressed airflow from the axial compressor 22 for distribution to an annular combustor 30 located within the rotationally fixed static outer support structure 14. Although two turbine stages are disclosed in the illustrated embodiment, it should be understood that any number of stages may be utilized by the present invention.

A turbine 32 includes a multitude of tip turbine blades 34 (two stages shown) which rotatably drive the hollow fan blades 28 relative a multitude of tip turbine stators 36 which extend radially inwardly from the static outer support structure 14. The annular combustor 30 is axially forward of the turbine 32 and communicates with the turbine 32.

Figure 2:
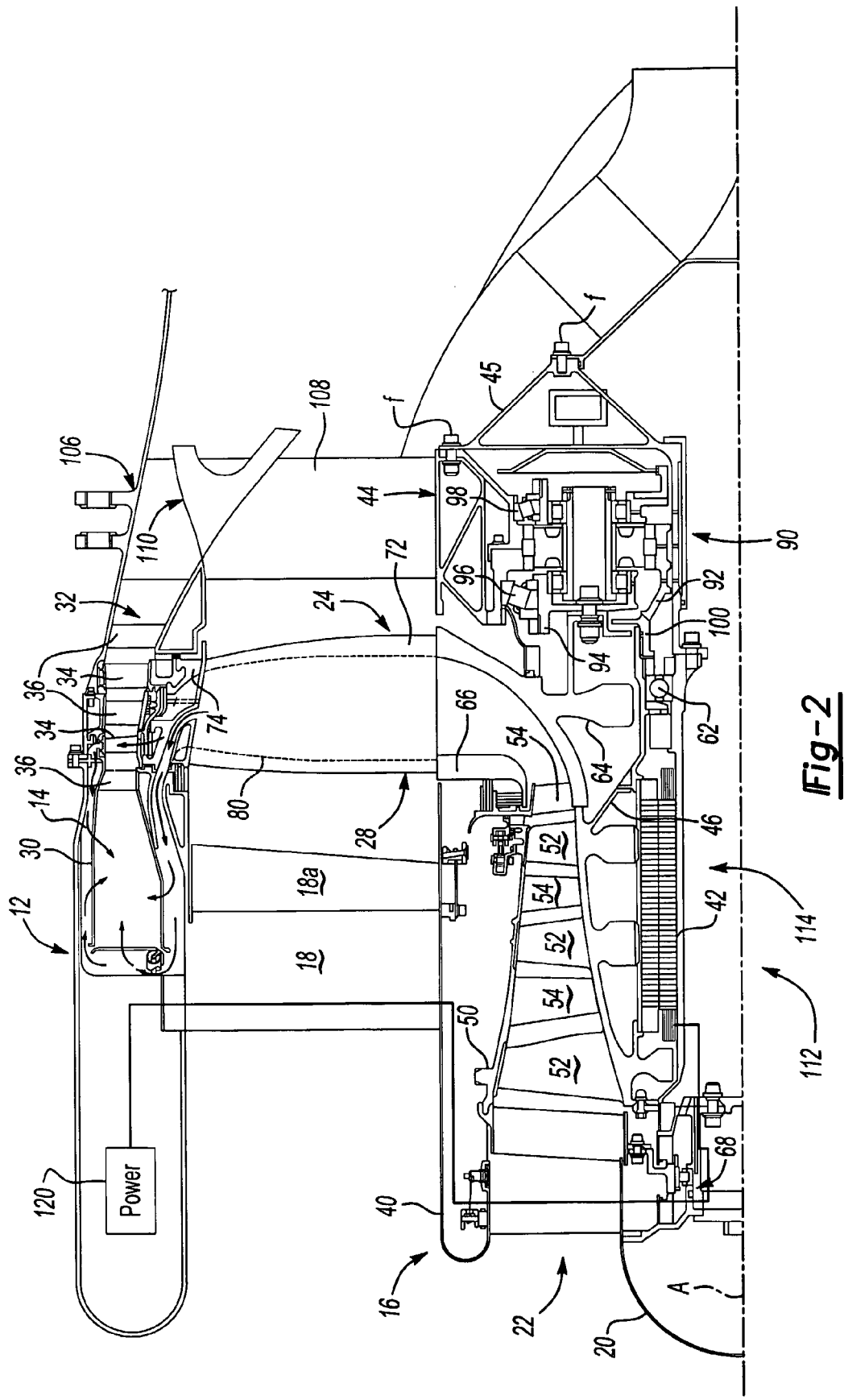
FIG. 2 is a longitudinal sectional view of a tip turbine engine along an engine centerline.

Referring to FIG. 2, the rotationally fixed static inner support structure 16 includes a splitter 40, a static inner support housing 42 and an static outer support housing 44 located coaxial to said engine centerline A. An aft housing 45 is attached to the static inner support housing 42 and the static outer support housing 44 through fasteners f such as bolts or the like. The static inner support housing 42, the static outer support housing 44, and the aft housing 45 are located about the engine centerline A to provide the non-rotating support structure for the engine 10.

The axial compressor 22 includes the axial compressor rotor 46 from which a plurality of compressor blades 52 extend radially outwardly and a compressor case 50. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a multitude of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is turned and diffused toward an axial airflow direction toward the annular combustor 30. Preferably the airflow is diffused axially forward in the engine 10, (i.e., in the opposite direction relative the axial airflow through the axial compressor 22), however, the airflow may alternatively be communicated in another direction.

A gearbox assembly 90 aft of the fan-turbine rotor assembly 24 provides a speed increase between the fan-turbine rotor assembly 24 and the axial compressor 22. Alternatively, the gearbox assembly 90 could provide a speed decrease between the fan-turbine rotor assembly 24 and the axial compressor rotor 46. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably a planetary gearbox that provides co-rotating or counter-rotating rotational engagement between the fan-turbine rotor assembly 24 and an axial compressor rotor 46. The gearbox assembly 90 is mounted for rotation between the sun gear shaft 92 and the static outer support housing 44 through a forward bearing 96 and a rear bearing 98. The forward bearing 96 and the rear bearing 98 are both tapered roller bearings and both handle radial loads. The forward bearing 96 handles the aft axial loads while the rear bearing 98 handles the forward axial loads. The sun gear shaft 92 is rotationally engaged with the axial compressor rotor 46 at a splined interconnection 100 or the like.

In operation, air enters the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused by the diffuser section 74 axially forward in the engine 10 into the annular combustor 30. The compressed core airflow from the hollow fan blades 28 is mixed with fuel in the annular combustor 30 and ignited to form a high-energy gas stream. The high-energy gas stream is expanded over the multitude of tip turbine blades 34 mounted about the outer periphery of the fan-turbine rotor assembly 24 to drive the fan-turbine rotor assembly 24, which in turn drives the axial compressor 22 through the gearbox assembly 90. Concurrent therewith, the fan-turbine rotor assembly 24 discharges fan bypass air axially aft to merge with the core airflow from the turbine 32 in an exhaust case 106. A multitude of exit guide vanes 108 are located between the static outer support housing 44 and the rotationally fixed static outer support structure 14 to guide the combined airflow out of the engine 10 to provide forward thrust. An exhaust mixer 110 mixes the airflow from the turbine blades 34 with the bypass airflow through the fan blades 28.

Figure 3:
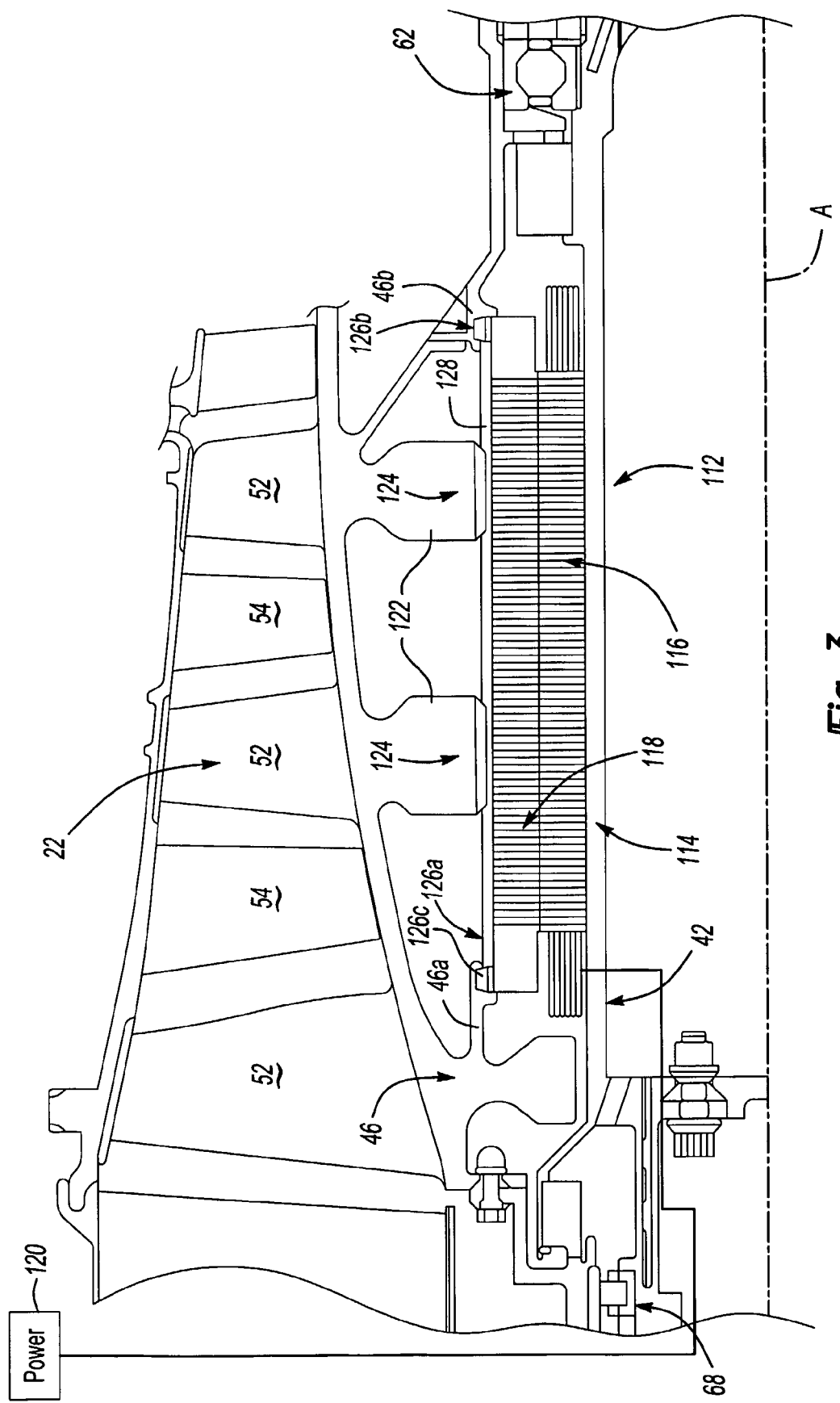
FIG. 3 is an expanded view of a starter-generator system.

Referring to FIG. 3, a starter-generator system 112 includes a starter motor-generator 114 with a fixed starter generator stator 116 and a starter generator rotor 118. The starter motor-generator 114 receives electrical power from an external power source 120 (illustrated schematically) such as a battery or other AC or DC power source. It should be understood that other external (e.g. a ground unit) and/or internal power sources and locations (FIG. 2) may alternatively or additionally be used. The starter motor-generator 114 is preferably an AC induction motor, a switched reluctance motor or a brushless DC starter motor which is located within and directly connected to the axial compressor rotor 46 to provide torque thereto. That is, operation of the starter motor directly rotates the axial compressor 22 without an accessory gearbox, clutch or the like. It should be understood that other electromagnetic machine configurations can be used.

Once the engine 10 achieves operating speed, the starter motor-generator 114 is preferably operated as an electrical generator to power various loads associated with the starting system or other vehicle components. Moreover, the elimination of an accessory gearbox decreases weight and complexity.

The fixed starter generator stator 116 is mounted to the static inner support housing 42. Preferably, the fixed starter generator stator 116 is shrink fit, press fit and/or keyed to the inner support housing 42. That is, the fixed starter generator stator 116 surrounds and is attached to a longitudinal length of the inner support housing 42.

The starter generator rotor 118 is preferably press-fit into the axial compressor rotor 46 at a splined stepped engagement 126a, 126b at an axial end segment of the starter generator rotor 118. That is, the compressor disks would not touch the starter rotor for stress reasons.

The starter generator rotor 118 surrounds the fixed starter generator stator 116 and is engagement with the axial compressor rotor 46. It should be understood that various attachment arrangements may be utilized to engage the starter generator rotor 118 with the axial compressor rotor 46. The starter generator rotor 118 may alternatively or additionally be engaged with a multitude of compressor rotor disks 122 at a splined engagement 124. Other splined engagement locations, as well as other mounting arrangements, may alternatively or additionally be used.

Alternatively or in addition, the starter generator rotor 118 is mounted within a sleeve 128 which could act as a tie-bolt to axially clamp the starter generator rotor 118 in the axial compressor rotor 46 stack between a first compressor rotor section 46a and a second compressor rotor section 46b.

Mounting the starter motor-generator 114 about the static inner support housing 42 within the bore of the engine 10 mitigates the risk associated with mounting an electromagnetic machine within a bearing compartment. The thermal energy generated by the starter motor-generator 114 is intermittent during engine start and is conducted through the axial compressor rotor 46 and/or the static inner support housing 42, gearbox thrust bearing 68 and the gearbox radial bearing 62. Furthermore, the static inner support housing 42 are in communication with a lubricating fluid system.

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A tip turbine engine comprising:
   a rotationally fixed support structure mounted along an engine centerline;
   an axial compressor rotor mounted for rotation about said rotationally fixed support structure;
   a fan-turbine rotor assembly having at least one fan blade that defined a core airflow passage therein, said fan-turbine rotor assembly mounted for rotation about said engine centerline;
   a starter generator rotor mounted for rotation with said axial compressor rotor, said starter generator rotor mounted within a rotor disk bore; and
   a starter generator stator mounted around a static inner support housing defined by said rotationally fixed support structure within said starter generator rotor, said starter generator rotor rotatable about said motor stator.

2. The tip turbine engine as recited in claim 1, further comprising a splined engagement between said starter generator rotor and said compressor rotor.

3. The tip turbine engine as recited in claim 2, wherein said splined engagement extends between a compressor disk bore and said starter generator rotor.

4. The tip turbine engine as recited in claim 1, further comprising a gearbox between said axial compressor rotor and said fan-turbine rotor assembly.

5. The tip turbine engine as recited in claim 1, further comprising an axial press fit engagement of said starter generator rotor within said axial compressor rotor between a first segment of said compressor rotor and a second segment of said axial compressor rotor.

* * * * *